United States Patent [19]
Benoit et al.

[11] Patent Number: 5,333,822
[45] Date of Patent: Aug. 2, 1994

[54] ATTACHMENT SYSTEM

[75] Inventors: James C. Benoit, Needham; Charles L. Deschenes, North Attleboro, both of Mass.

[73] Assignee: Avery Dennison Corporation, Pasadena, Calif.

[21] Appl. No.: 876,369

[22] Filed: Apr. 30, 1992

[51] Int. Cl.5 .............................................. F16L 3/08
[52] U.S. Cl. .................................... 248/71; 248/74.3; 24/508; 411/913
[58] Field of Search ...................... 248/73, 74.3, 221.3, 248/221.4, 71; 411/508–510, 913; 24/297, 628, 453

[56] References Cited

U.S. PATENT DOCUMENTS

| | | | |
|---|---|---|---|
| 3,093,027 | 6/1963 | Rapata | 24/453 X |
| 3,210,032 | 10/1965 | Van Slyke | 248/73 |
| 3,342,095 | 9/1967 | Buntic | 411/508 |
| 3,667,710 | 6/1972 | Moody et al. | 248/73 X |
| 4,635,325 | 1/1987 | Yagi | 24/297 X |
| 4,669,688 | 6/1987 | Itoh et al. | 248/74.3 X |
| 4,784,358 | 11/1988 | Kohut | 248/73 X |
| 5,005,265 | 4/1991 | Muller | 411/913 X |
| 5,012,995 | 5/1991 | Ward et al. | 248/73 X |

FOREIGN PATENT DOCUMENTS 1381705  11/1964  France .................. 24/297

Primary Examiner—David A. Scherbel
Assistant Examiner—Derek J. Berger
Attorney, Agent, or Firm—Kriegsman & Kriegsman

[57] ABSTRACT

A locator tie for attaching an element, such as a bundle of electrical wires, to a thin wall having an aperture. The locator tie comprises of a cable tie (11) capable of surrounding and engaging the element and an arrowhead connector (12) connected to the cable tie, the arrowhead connector being adapted so that it is easily inserted into the aperture but removed from the aperture only with great difficulty.

The arrowhead connector (12) has an arrowhead (34) consisting of two blades (35 and 36) and a hinge (37) connecting the two blades. The arrowhead is supported on a support structure (31) and is connected to the cable tie in such a way that insertion force is minimized, extraction force is maximized, and stress-induced failure of the support structure is minimized.

The structure includes two arms (51 and 52) which engage the blades of the arrowhead and two legs (54 and 55) which connect to a split connector on the cable tie.

11 Claims, 11 Drawing Sheets

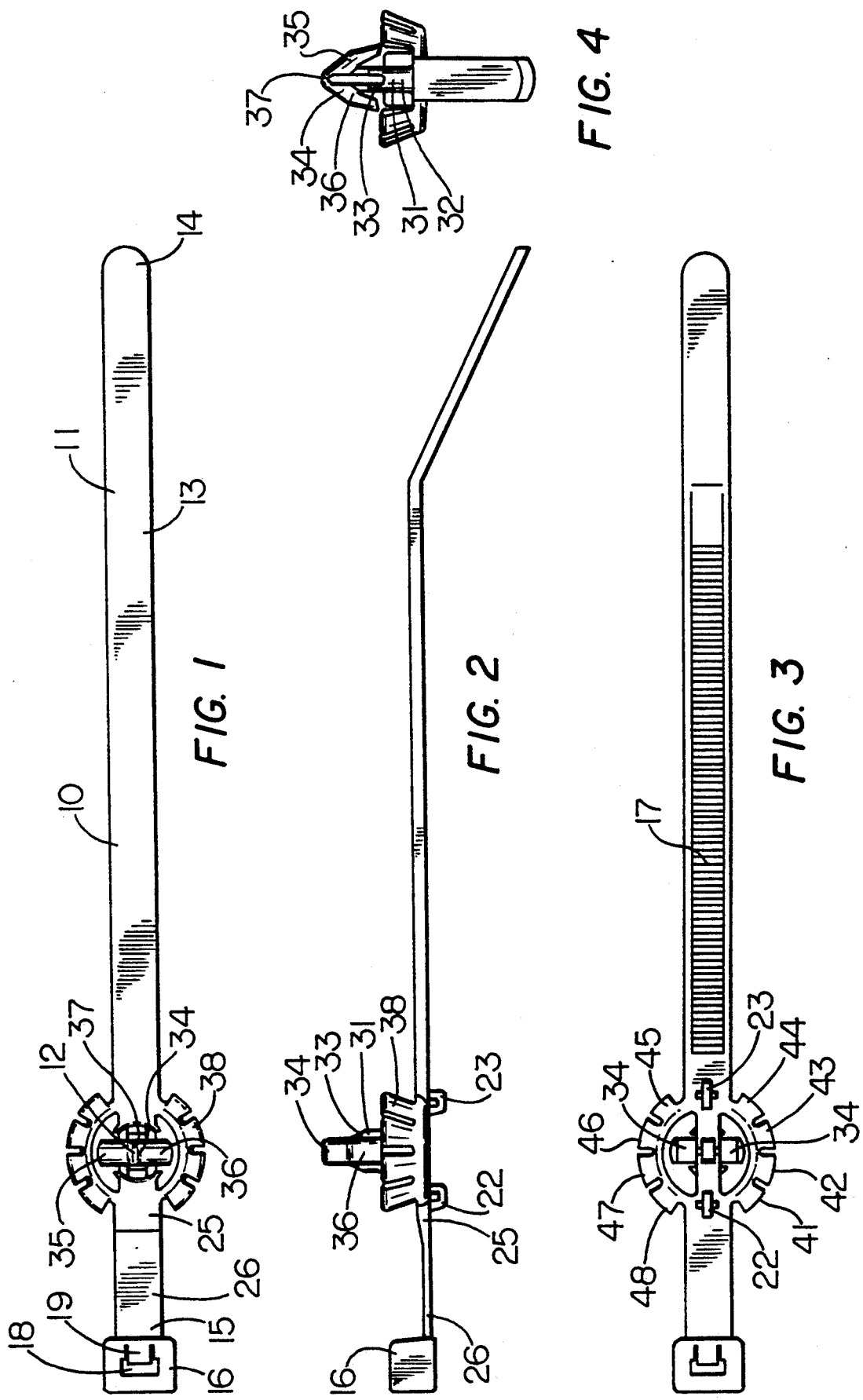

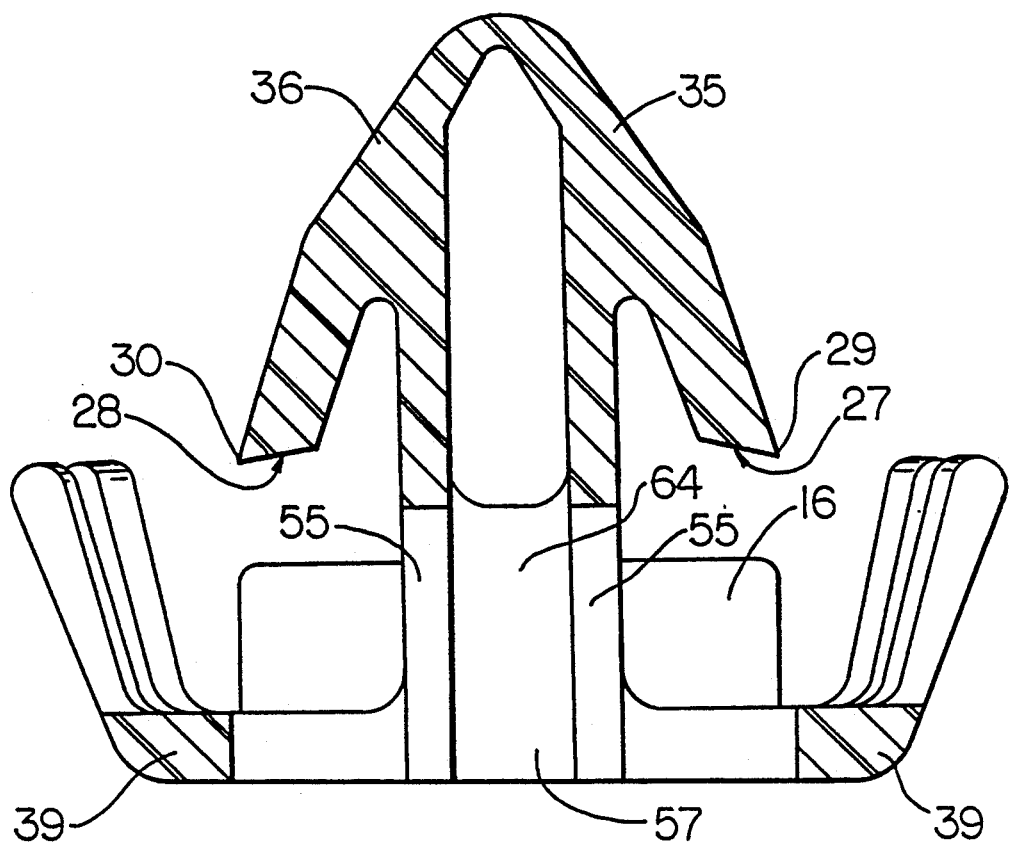

ATTACHMENT SYSTEM

FIELD OF THE INVENTION

This invention is a system for attaching an object to a thin-walled surface.

BACKGROUND OF THE INVENTION

There are numerous circumstances, particularly in vehicle and appliance construction, where it is desirable to attach an element, such as a bundle of electrical wires or tubing to the near side of a thin wall. Frequently the far side of the thin wall is not easily accessible and it is therefore desirable to allow attachment exclusively with activity on the near side of the wall. The present invention concerns a solution to this problem in which a small aperture is formed in the thin wall, and an arrowhead connector is easily pushed through the aperture but is removed from the aperture only with extreme difficulty. By connecting this arrowhead connector to a cable tie of the conventional type, a very effective system for connecting elements such as electrical cable to a sheet metal wall can result. Furthermore, this type of connector allows nondestructive replacement since the connector is designed to be disengaged from the aperture without damage to the aperture.

When this system is used on products such as vehicles which are exposed to extremes of temperature and moisture and are exposed to the ravages of time, connectors of the prior art type, which are typically formed of engineering polymers, can fail in their function in various ways and, as a result, the elements which are intended to be connected and essentially immobilized are allowed to break loose, rattle and cause various disturbances which are unacceptable to the operator of the vehicle and which require expensive and inconvenient maintenance.

A particular source of failure concerns the design of the arrow connector and the means by which it connects to the cable tie.

The prior art approaches to this arrowhead connector generally take two forms. The basic form is a unitary arrowhead mounted on the end of a unitary support which is connected to the cable tie. This design is shown in FIGS. 14–16. Those familiar with the drawability requirements of high speed injection molding of plastic will recognize that this design inherently includes certain limitations which, when applied to the present application, frequently result in service failures. The concept of drawability refers to the property of a molded workpiece that the two halves of the mold can be drawn apart and opened without the completed workpiece interfering with that motion. It usually means (that is, in a mold without side action) that there are one or more closed parting lines on the workpiece which separate the surface that faces one mold half from the surface that faces the other half, and no point faces a mold half through another part of the workpiece. More specifically, if the unitary support does not have a large cross-sectional area, it tends to break off at the point where it is connected to the cable tie. However, if the support does have a large cross-sectional area, it creates a rigid connection at its arrow end and causes the insertion force of the arrow to be unacceptably high. On the other hand, if the arrow end of the support is made very small, the connection between the support and the arrow head will fail. Because of drawability considerations, it is essentially impossible, at reasonable cost, to make the support large at the bottom and small at the top even if the above considerations would allow the resulting structure to be acceptable in the service environment. As a result, the wings or blades of the arrowhead are required to be both flexible, to allow insertion, and strong, to prevent unintended extraction. This conflict in properties often results in failure of the connector.

A second approach, which was an attempt to overcome the above-described disadvantages of the unitary-arrow, unitary-support design, involved a split arrowhead. In that design, shown in FIGS. 17–21, the support was actually split into two arms and each of the arms carried one of the blades of the split arrowhead. The resulting structure was an improvement over the unitary head design but continued to experience an unacceptable level of service failures. The service failures basically concentrated around two areas. One area involved failures at the location where the support connected to the tie. The other problem involved essentially a false connection. Frequently, the application of the system caused the arrow to be inserted into the aperture at an angle. See FIG. 20. If both of the blades or wings of the arrowhead did not enter the aperture, but rather if only one of the blades entered the aperture, frequently that blade could catch on the far surface of the wall and create an apparent connection. See FIG. 21. Because the remaining blade would be pressed snugly against the near wall, the resulting structure appeared and felt quite solid. However, after a short time, the vibration associated with the service environment would cause the connector to pull out and would result in a failure. These and other difficulties experienced with the prior art devices have been obviated in a novel manner by the present invention.

It is, therefore, an outstanding object of the invention to provide a locator tie which can easily be connected to the element which is to be located.

Another object of this invention is the provision of a locator tie which can easily be connected through an aperture in a thin wall.

A further object of the present invention is the provision of a locator tie which has a very low insertion force when it is being inserted into the aperture of a wall.

It is another object of the instant invention to provide a locator tie which has a very high extraction force once it has been inserted into an aperture in a wall.

A still further object of the invention is the provision of an arrowhead support structure which is drawable from molding cavities and yet has reinforcements and strain relief at points of potential failure.

A still further object of the present invention is the provision of an arrowhead support structure which is relatively uniform along its length in peripheral dimension but which has a low compression resistance at its arrow end and a very large surface area at its tie end.

Another object of the invention is the provision of a locator tie which is easy and inexpensive to manufacture, easy and inexpensive to apply and which is capable of a long and useful life with minimum maintenance.

With these and other objects in view, as will be apparent to those skilled in the art, the invention resides in the combination of parts set forth in the specification and covered by the claims appended hereto.

SUMMARY OF THE INVENTION

This invention is a pushmount fastener and more specifically, a pushmount fastener attached to a cable tie to form a locator tie. The pushmount fastener is essentially a device for attaching an element or a base to a wall which has an aperture formed in it. The arrowhead-like structure is forced into the aperture in such a way that it goes into the aperture easily but cannot be removed from the aperture easily. When this pushmount fastener is connected to a conventional cable tie, the resulting structure creates a very effective means for attaching generally cylindrical elements to a thin wall. The cable tie is a device which is an elongated strip of material with an engagement head at one end. The elongated strip typically has an engagement surface, which, when fed through the engagement head is locked in the head and cannot thereafter be extracted.

The present invention allows simple and inexpensive manufacture on high speed injection molding equipment because the design is drawable. The unitary arrow-head prevents splitting of the head during insertion and thereby prevents false connections. The low insertion force is brought about by providing a two-stage insertion surface on the outside of the arrow blades so that the initial contact of the arrowhead with the sides of the aperture provides high mechanical advantage and the subsequent sliding contact with the second stage of the contact surface is significantly facilitated because the surfaces become parallel to the axis of movement of the arrowhead due to arrowhead compression. This arrowhead compression is facilitated by the splitting of the upper end of the support structure into two arms so that the support structure is easily radially compressible.

The extraction force is maximized by providing reenforcement at the connection between the arrowhead blades and the arms of the upper end (arms) of the support. This essentially reinforces the arrowhead blades. This reinforcement does not negatively affect the insertion force, however, because compression can take place between the arms of the support. The resiliency of the arms provides shock absorbing action when the blades are in the use configuration, thus reducing shock-induced failures.

The failure of the prior art devices at the connection between the arrowhead support and the cable tie are addressed in two separate ways. First of all, the base of the support is designed to maximize the surface area of the connection between the support and the tie and to defuse strain concentrations so that the potential for failure at the connection between the support and the cable tie is minimized.

However, there is an additional failure mode which this invention addresses. In order to provide drawability of the arrowhead, the support for the arrowhead must normally be connected to the cable tie on a narrowed section or isthmus formed in the cable tie. The weakness in the cable tie caused by the formation of this isthmus, is typically compensated for by providing additional reinforcing material along both edges of the tie. Therefore, the tensile strength of the tie is generally not reduced. However, it has been found that when the tie is flexed away from the arrowhead as is done in normal use, this particular form of strain places a curling stress on the isthmus and frequently causes stress-induced failure at one or both ends of the isthmus or at the connection between the isthmus and the support. While this failure might appear to be a failure of the arrowhead support base, in fact, it is a failure of the cable tie itself. The present invention addresses this failure mode by splitting the base of the arrowhead support into two legs and mounting each leg of the base on separated elements of the cable tie. Because these elements are separated, they provide strain relief from the flex-induced strain which would normally occur during use of the product and thereby significantly reduce the incidence of this failure mode.

BRIEF DESCRIPTION OF THE DRAWINGS

The character of the invention, however, may be best understood by reference to one of its structural forms, as illustrated by the accompanying drawings, in which:

FIG. 1 is a top view of a locator tie embodying the principles of the present invention, FIG. 2 is a side view of the device shown in FIG. 1, FIG. 3 is a bottom view of the device shown in FIG. 1, FIG. 4 is an end view of the device shown in FIG. 1, FIG. 9 is a sectional right side view of the device shown in FIG. 5, taken along line IX—IX of FIG. 6, FIG. 10 is a sectional plan view of the central portion of the device shown in FIG. 5, taken along line X—X of FIG. 8, FIG. 25 shows the device shown in FIG. 22 after pull-back and lock-in.

DESCRIPTION OF THE PREFERRED EMBODIMENT

Figure 5:
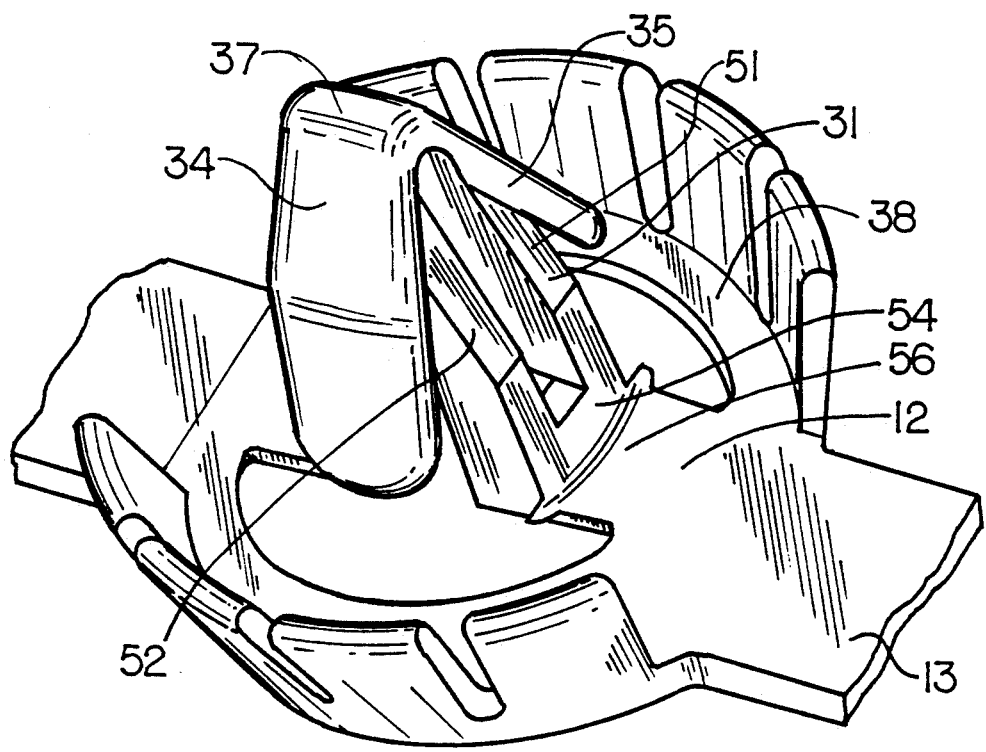
FIG. 5 is a perspective view of a pushmount fastener embodying the principles of the present invention.

Referring first to FIG. 1 in which are best shown the general features of the present invention, the locator tie, designated generally by the numeral 10, is shown to include a cable tie 11, and a pushmount fastener 12 connected to the cable tie 11. The cable tie 11 includes a strap 13. Strap 13 includes a tail strap 14 and a head 15. The head strap 15 carries an engagement head 16. On the undersurface of the strap portion 13, best shown in FIG. 3, are a series of serrations which form the engagement surface 17 as is conventional in cable ties. The engagement surface is designed so that, when the tail strap 14 of the strap 13 is fed through an engagement opening 18 of the engagement head 16, a pawl 19 within the engagement head 16 locks onto the engagement surface 17 and prevents extraction of the strap from the opening in the engagement head 16. This cable tie is therefore used in the conventional manner to surround and permanently engage an element to be held, in more specifically a cylindrical bundle of, for example, electrical wires or cable. In the preferred embodiment, cable to be held is surrounded with a corrugated jacket which jacket can be engaged by holding blocks 22 and 23. This arrangement will keep the jacket and surrounded cable from sliding in the looped cable tie.

The pushmount fastener 12 is integrally formed with the cable tie 11 during injection molding of the locator tie 10. The pushmount fastener 12 is positioned near, but spaced from, the engagement head 16. The separation and resulting flexibility between the engagement head 16 and the pushmount fastener 12 diffuse the flexing stresses along the length of the connecting strap, and avoid focusing those stresses at the base of the arrowhead connector. This effect is enhanced by making the portion 25 of the strap, near the basket, thicker than the portion 26 of the strap, near the engagement head. It is very important that the strap between the fastener and the engagement head be quite flexible. In this way, when the engagement head engages the free end, the engagement head is flexed back away from the arrowhead and thus minimizes interference, by the engagement head with the insertion of the arrowhead. The pushmount fastener 12 includes a connector or support 31 which is connected to the strap portion 13 of the cable tie 11 by the base end 32 of the support. The support 31 also has an upper end 33 which extends away from the strap portion 13. Mounted on the upper end 33 of the support 31 is a unitary, two-bladed arrowhead 34 having blade 35, blade 36, and a hinge 37 connecting the blades at the farthest point from the strap portion 13. Although a two-blade arrow is the preferred embodiment, the invention includes more than two blades as an alternative. Surrounding the arrowhead 34 is a spring and more specifically, a spring-biased basket 38 which consists of a circular support element 39 which is integral with and part of the plane of the strap portion 13, and a plurality of spring fingers 41, 42, 43, 44, 45, 46, 47 and 48 which extend from the support ring 39 along with but angled away from the arrowhead 34. Although the preferred number of fingers in this design is eight, other situations can employ from two to the maximum number practical.

FIG. 5 shows a perspective view of the pushmount fastener. This view shows how each blade of the unitary arrowhead 34 is mounted on a separate one of the arms 51 and 52 of the support 31. Likewise, each of the legs 54 and 55 (shown in FIG. 9), are formed by splitting the base end 32 of the support 31 along an axis perpendicular to the split between the arms 51 and 52. Although the preferred embodiment has the legs split on an axis perpendicular to the split of the arms and to the length of the strap, other angles are possible.

Figure 6:
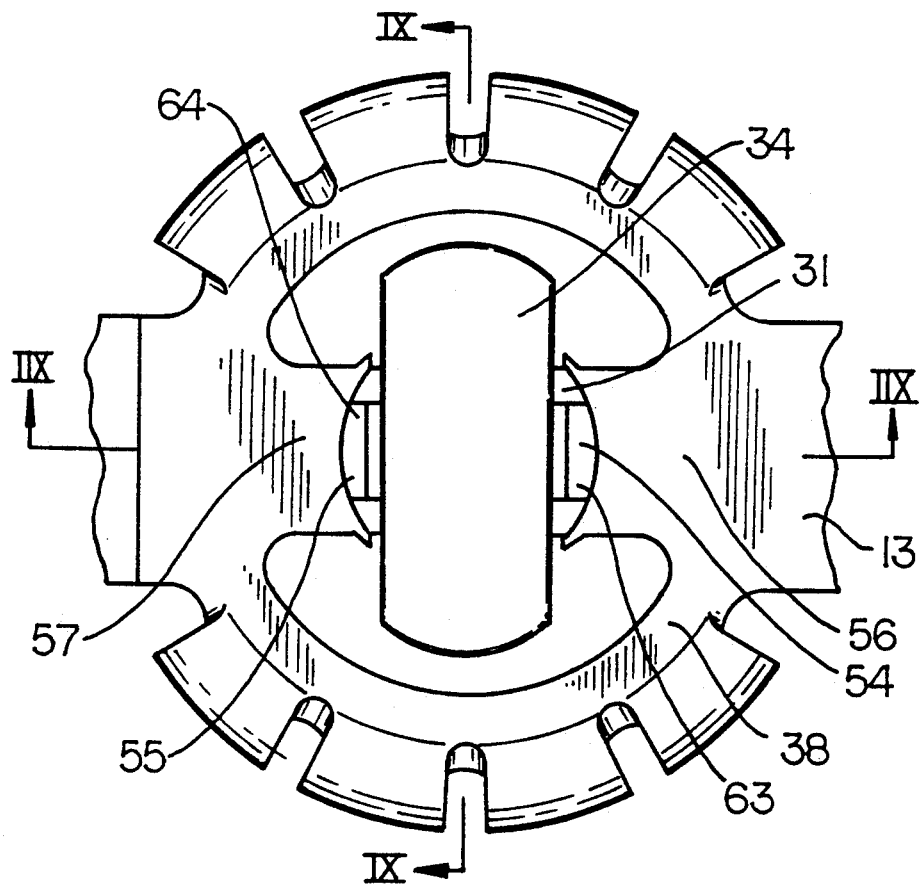
FIG. 6 is a plan view of the device shown in FIG. 5.

FIG. 6 shows a plan view of the pushmount fastener. In this view, both legs 54 and 55 and projections 56 and 57 can be seen.

Figure 7:
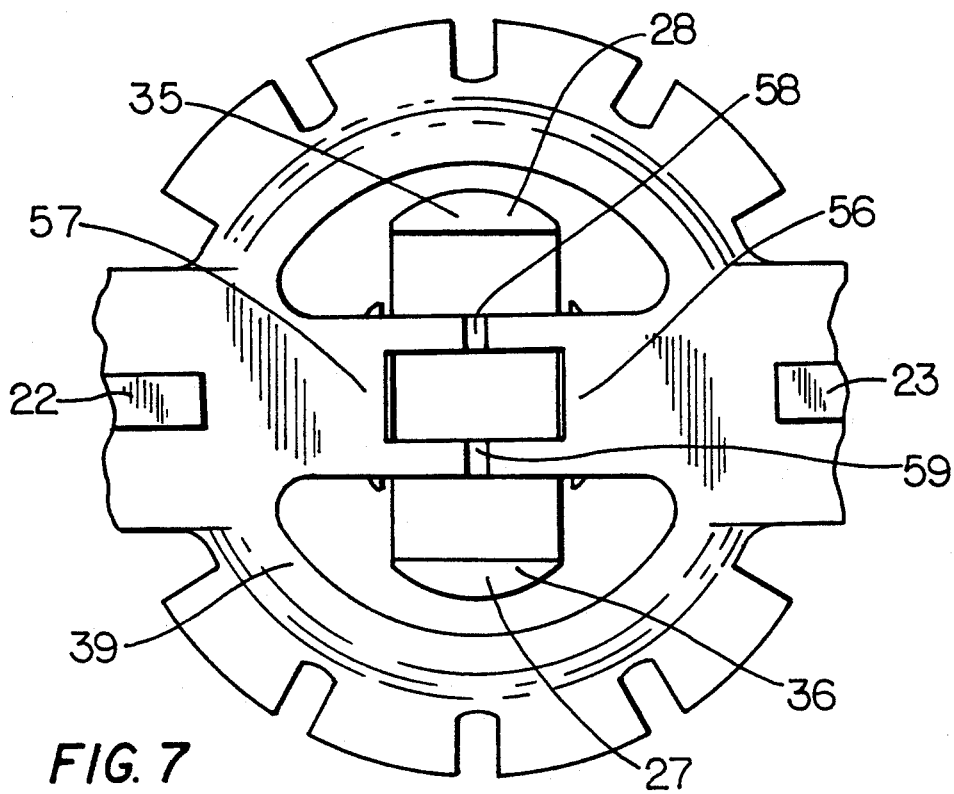
FIG. 7 is a bottom view of the device shown in FIG. 5.

FIG. 7 shows the underside of the pushmount fastener 12. It is important to note the spaces or separations 58 and 59 between projections 56 and 57. These spaces will allow strain relief as will be discussed below.

Figure 8:
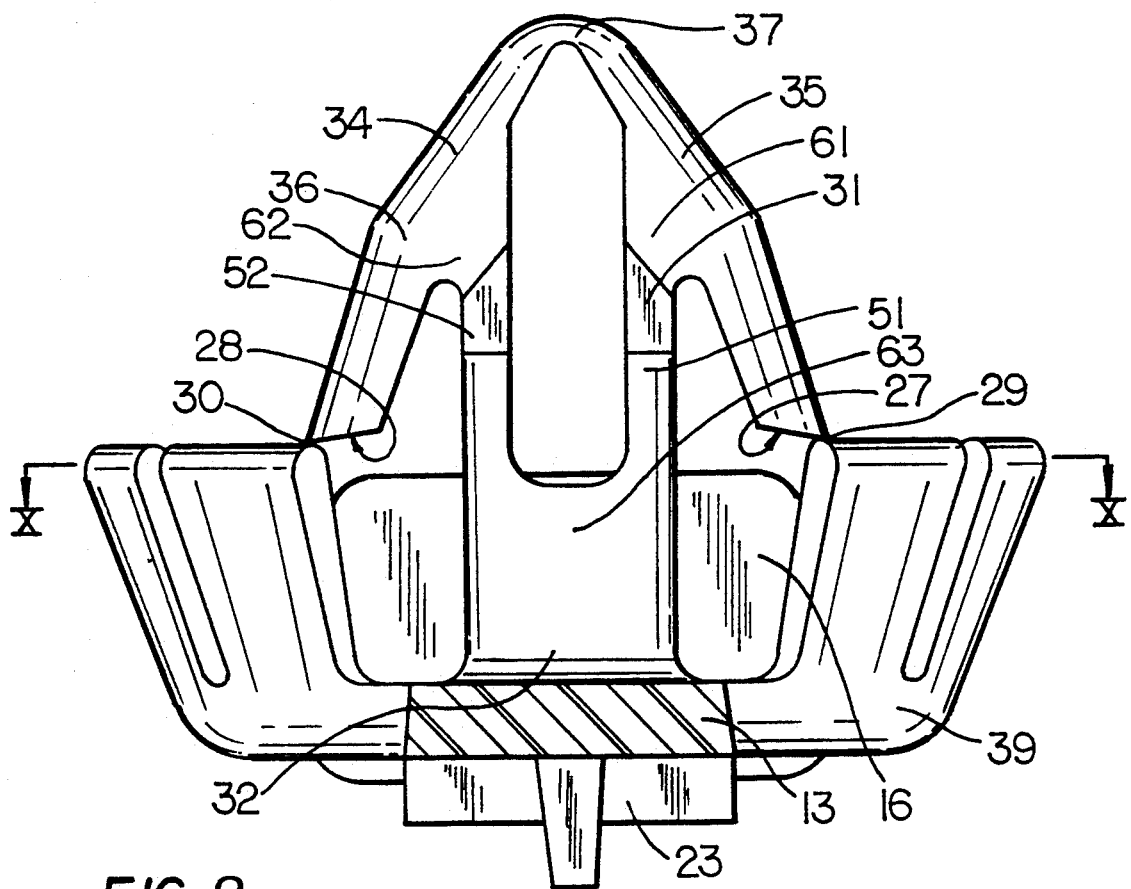
FIG. 8 is an end view of the device shown in FIG. 5.
Figure 25:
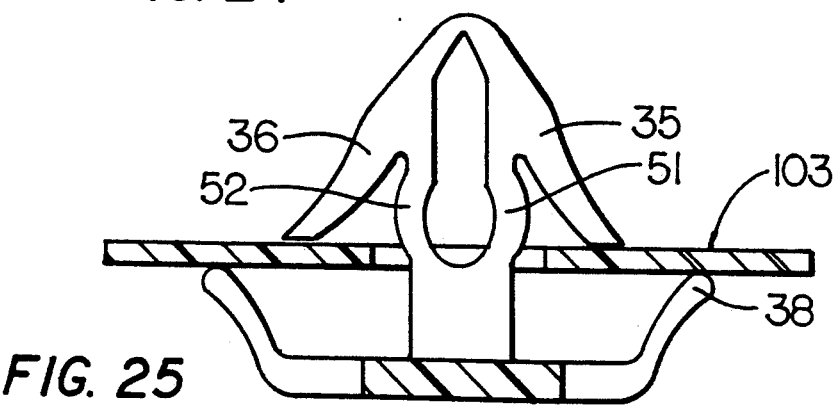

FIG. 8 shows the profile of the arrowhead and support. Each blade 35 and 36 of the arrowhead 34 is mounted on a separate arm 51 and 52 by reinforced material 61 and 62. This reinforced material makes the connection between the blades and the arms very strong and rigid, but, because the arms are somewhat resilient, the arrowhead can be easily compressed and provides a shock absorbing action when the blades are pulled outward. Because of the meniscus 63 and 64 (shown in FIG. 9), the springiness of the support is limited to the upward end of the support between the blades. This directs the compression stress away from the base end 32 of the support 31. FIG. 8 also shows a very important geometric feature on the lower surfaces 27 and 28 of the blades 35 and 36. These lower surfaces are angled upward (toward the arrow hinge 37) from the barbs 29 and 30 of the blades, so that the lower surfaces face toward the base 32 of the connector 31. The surfaces 27 and 28 are at an angle of 5 to 6 degrees from the axis of the strap 13. The function of the surfaces is best seen in FIG. 25, discussed below.

FIG. 9 is a cross-sectional view from the same perspective as FIG. 8. In FIG. 9, one can see the projection 57 extending toward the viewer and upon which the leg 55 is mounted. The inside of the meniscus 64 can be seen.

FIG. 10 is a top or plan view in cross-section viewed along line X—X of FIG. 8. In this view one can see the separation between, on the one hand, projection 56 and leg 54, and on the other hand projection 57 and leg 55. As will be discussed below, this separation allows the two legs to be distorted toward one another as a form of strain relief.

Figure 11:
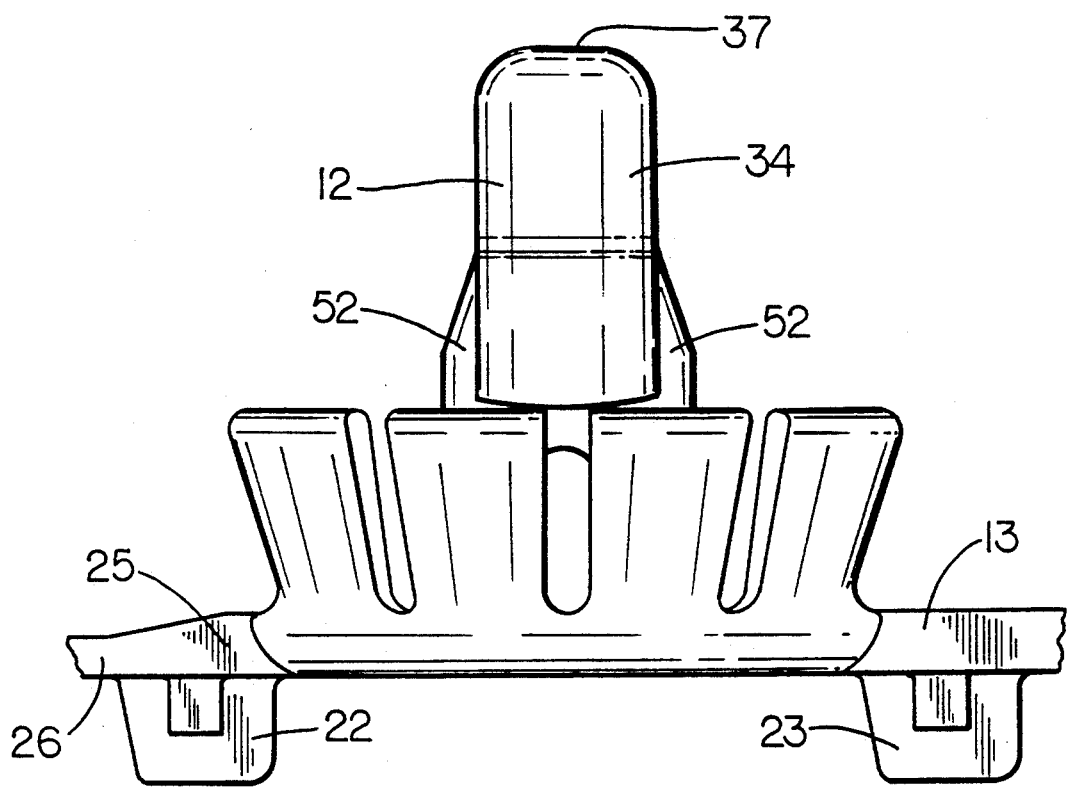
FIG. 11 is a side view of the device shown in FIG. 5.

FIG. 11 shows a side view of the pushmount fastener 12.

Figure 12:
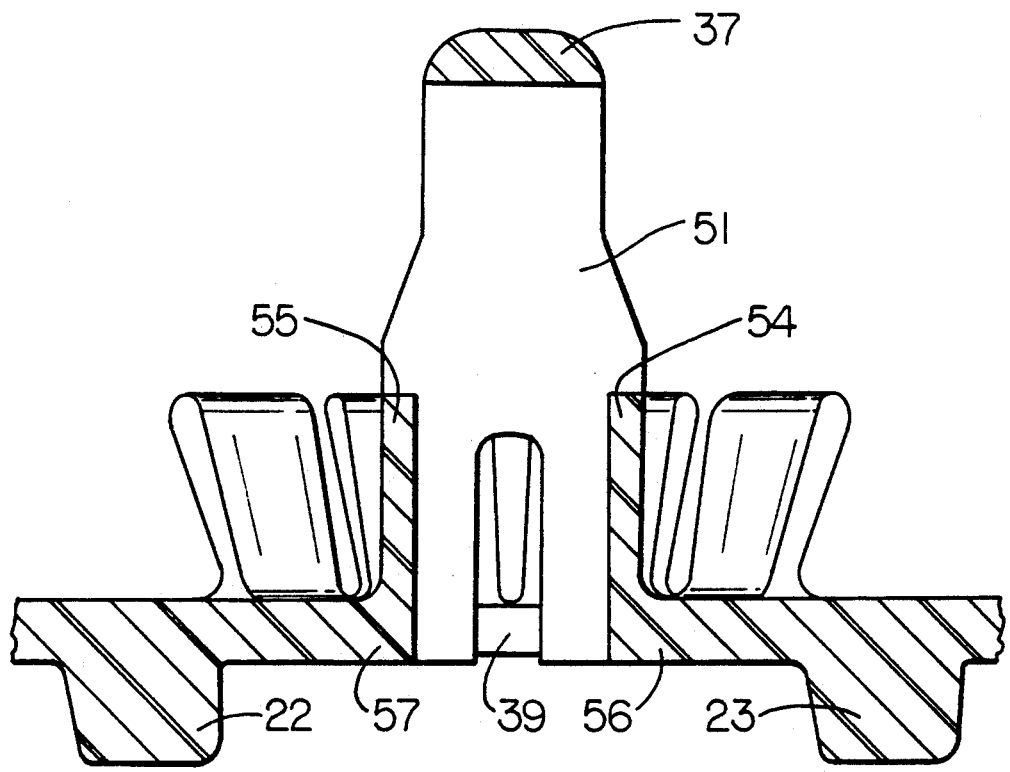
FIG. 12 is a sectional side view of the device shown in FIG. 5, taken along line XII—XII of FIG. 6.

FIG. 12 shows a cross-sectional view from the same perspective as FIG. 11 but viewed along line XII—XII of FIG. 6. This figure provides a side view of the separation between projection 56 and 57 through which one can see the support ring 39. The separation, as will be seen below, provides strain relief.

Figure 13:
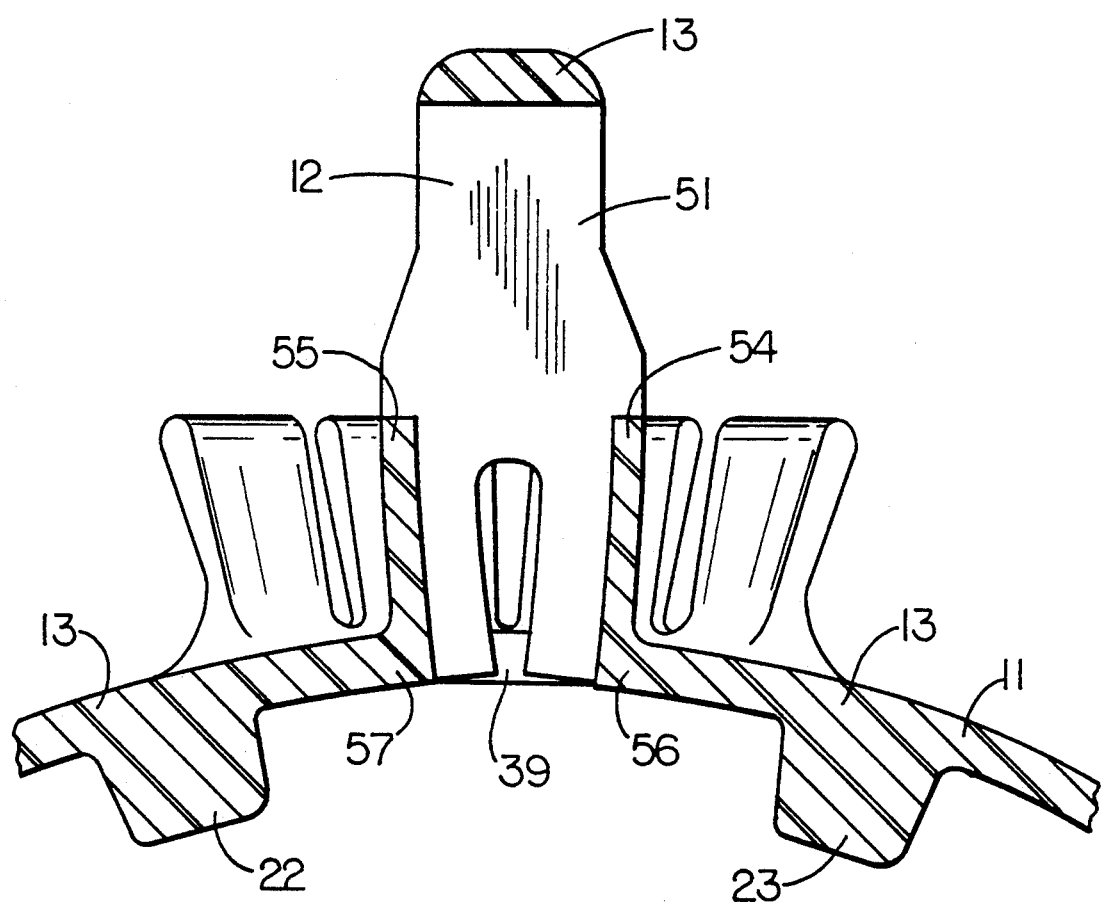
FIG. 13 is another view of FIG. 12 showing the strain relief effect of the split isthmus feature.

FIG. 13 is a view identical to FIG. 12 except that the strap portion 13 of the cable tie 11 has been flexed away from the pushmount fastener 12. It can be seen that some of the stress created by this flexing can be absorbed by the resiliency of legs 54 and 55 which results in a reduction in the separations 58 and 59 between the base or free ends of projections 56 and 57.

Figure 14:
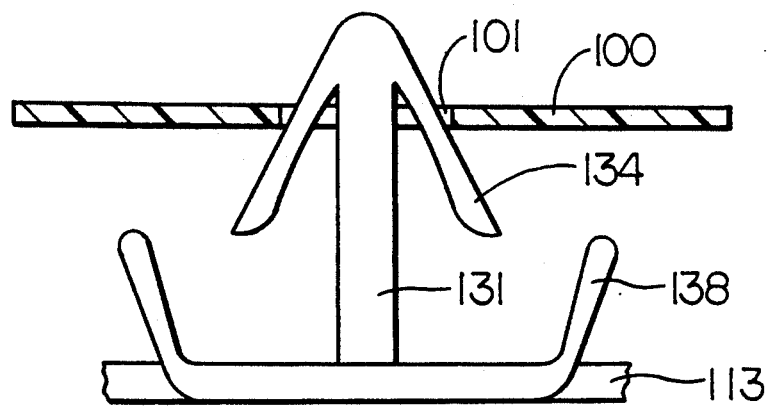
FIG. 14 shows a diagrammatic side view of a prior art device including a unitary arrowhead and unitary support prior to insertion.
Figure 15:
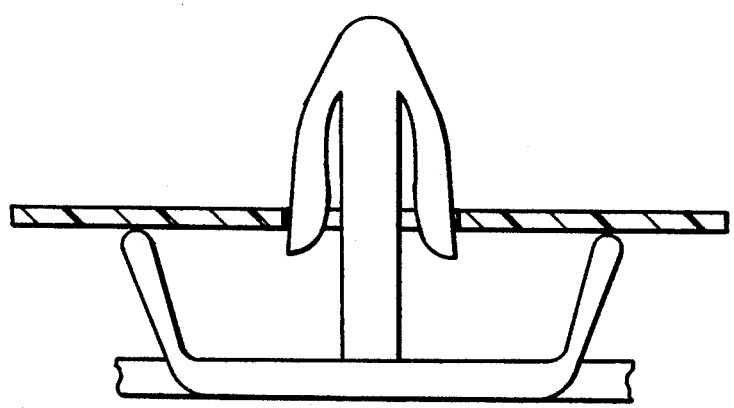
FIG. 15 shows the device shown in FIG. 14 during insertion.
Figure 16:
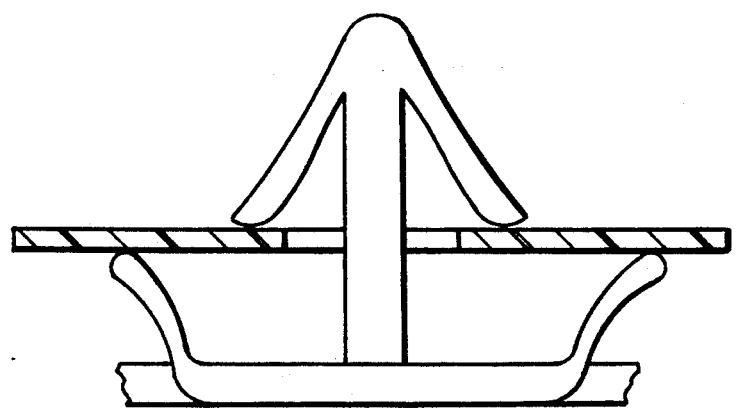
FIG. 16 shows the device shown in FIG. 14 after insertion.
Figure 17:
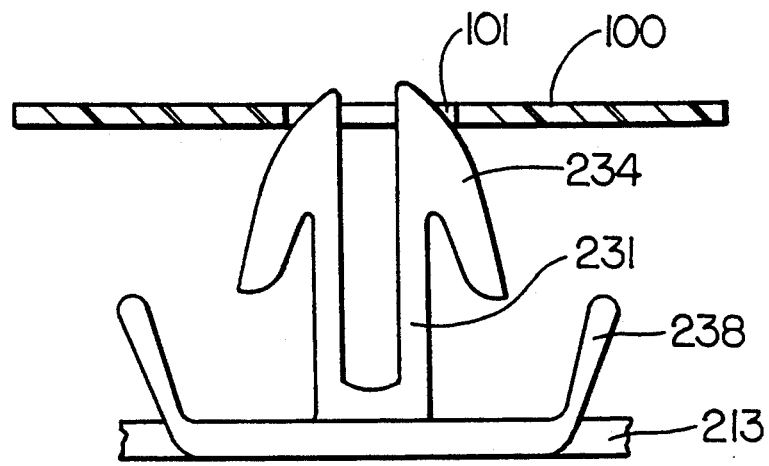
FIG. 17 shows a second type of prior art device involving a split arrowhead and split support prior to insertion.
Figure 18:
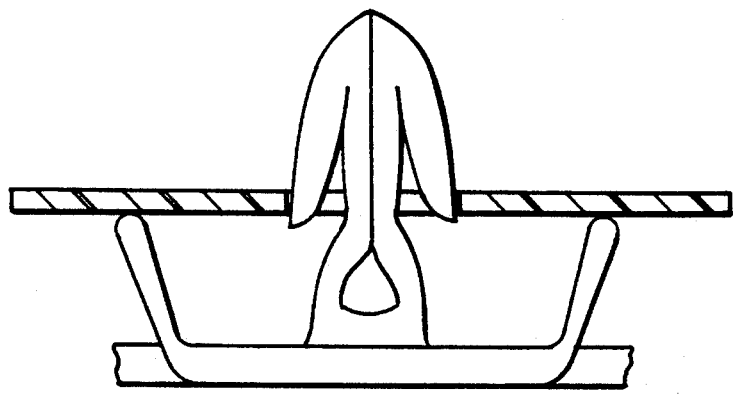
FIG. 18 shows the device shown in FIG. 17 during insertion.
Figure 19:
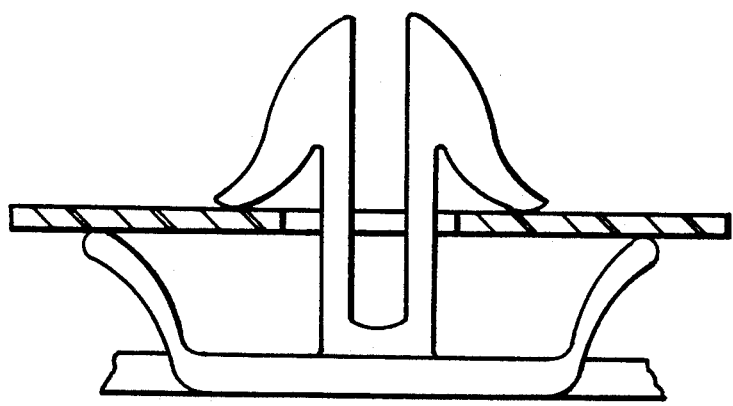
FIG. 19 shows the device shown in FIG. 17 after insertion.
Figure 20:
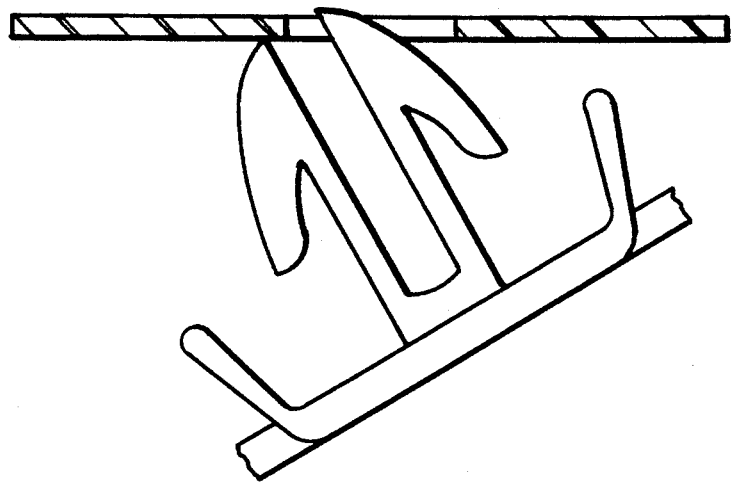
FIG. 20 shows the device shown in FIGS. 17-19 at the beginning of a false connection mode.
Figure 21:
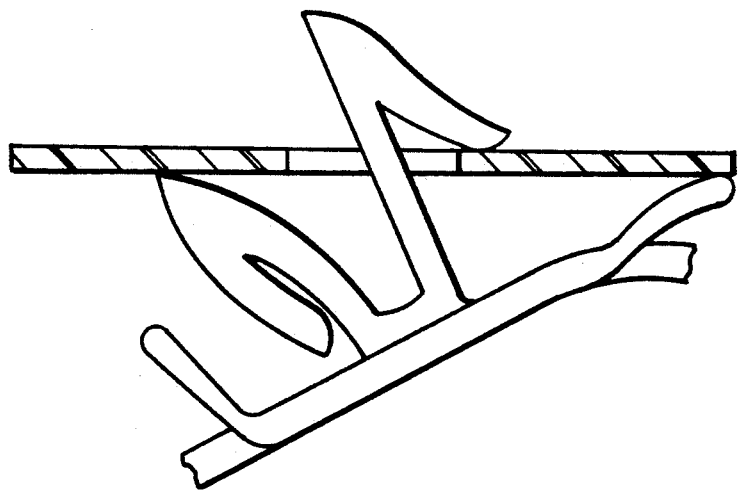
FIG. 21 shows the device shown in FIGS. 17-20 in the false-connection mode.

As described above, FIGS. 14, 15 and 16 are a diagrammatic representation of the operation of a prior art unitary-arrowhead, unitary-support pushmount fastener. In FIG. 14, the arrowhead 134 is pushed through the aperture 101 of the thin wall 100 by pressure on strap portion 113, basket 138 and support 131. In FIG. 15, the arrowhead continues through the aperture 101. In FIG. 16, the arrowhead 134 passes through the aperture 101, springs open and locks against extraction while basket 138 slightly biases the arrowhead toward extraction. The problems with this system are discussed above. FIGS. 17–21 diagrammatically present the operation of the prior art split-arrow, split-support pushmount fastener. FIGS. 17–19 correspond to the operation of the other fastener. FIGS. 20 and 21 demonstrate the false-connection failure mode, in which the split arrow does not entirely pass through the aperture 101 of wall 100.

FIGS. 22–25 provide a diagrammatic representation of the insertion and locking action of the pushmount fastener 12 embodying the principles of the present invention.

Figure 22:
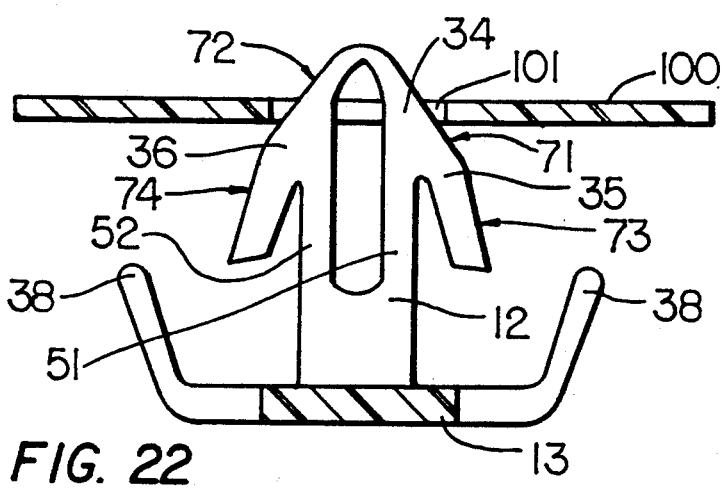
FIG. 22 shows a diagrammatic view of the present invention in the first stage of insertion.
Figure 23:
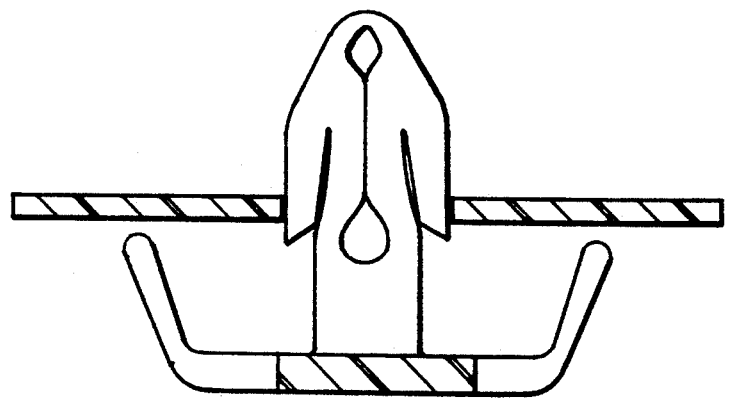
FIG. 23 shows a diagrammatic view of the device in FIG. 22 during the second stage of insertion.

FIG. 22 shows the arrowhead 34 during the initial stage of insertion into the aperture 101 of wall 100. The edges of the aperture 101 engage the high angle surfaces 71 and 72 (first zone) of blades 35 and 36, respectively. Because of the hinge 37 between the blades 35 and 36, there is no chance of the arrow splitting as can occur in the split-arrow prior art fastener. The action of the edges of aperture 101 on the high-angle portions 71 and 72 cause a cam action and compression action inwardly on each of the blades.

The compression action pushing inwardly on the blades causes the resilient arms 51 and 52 to collapse into the separation between them and allows the blades 35 and 36 to be compressed tightly against the arms, as the aperture moves along the first zone, passes the transition zone, and moves along the second zone. In this way, the low-angle portion 73 and 74 (second zone) of blades 35 and 36 are moved into an essentially parallel relationship with the axis of the arrowhead and the walls of the aperture, thereby allowing the arrowhead to slide very easily through the aperture 101, without further compression.

Figure 24:
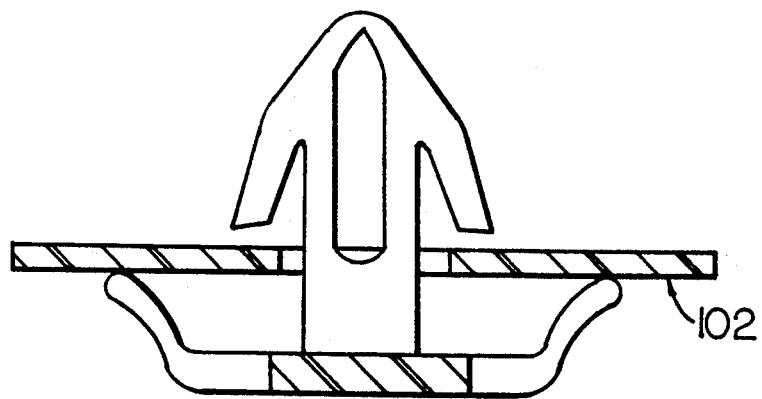
FIG. 24 shows the device shown in FIG. 22 after extended insertion.

FIG. 24 shows the arrowhead after passing through the aperture 101 and after having expanded outwardly. The fingers of the basket 38 have engaged the near surface 102 of the wall 100, thereby slightly biasing the fastener toward extraction.

In FIG. 25, the arrowhead is drawn backward slightly and a force equilibrium exists between the inward bias of the blades 35 and 36 and arms 51 and 52, balanced against the resilient force of the fingers of the basket 38. The lower surfaces 27 and 28 of each blade 35 and 36 function to cam the blades outward as the barbs 29 and 30 engage the far wall 103. As force equilibrium is established, the lower surfaces 27 and 28 tend to establish surface contact with the far wall 103 and distribute stresses over the thickness of the blades. This reduces long-term stress-related failures of the barbs 29 and 30. It is noted that the resiliency of the fingers of the basket and of the arms 51 and 52 provide a shock absorbing action which tends to dissipate high-shock-type upsets which would ordinarily induce shock-type failures. The basket design adds versatility as it is able to function with a wide range of wall thicknesses.

Figure 26:
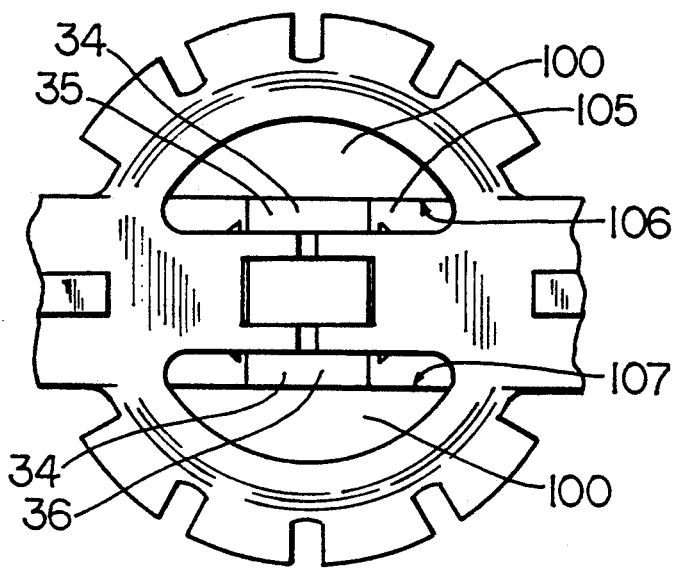
FIG. 26 shows the view and device shown in FIG. 7, but with the arrowhead through and bridging the minor axis of a slot-shaped aperture.
Figure 27:
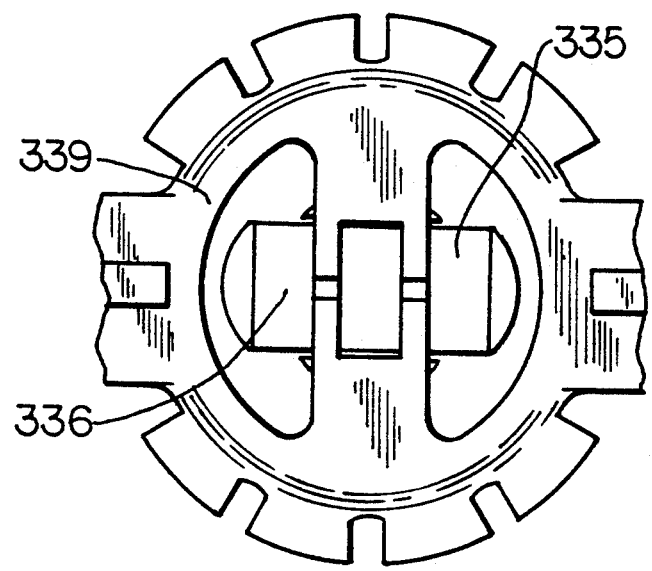
FIG. 27 shows a device similar to that shown in FIG. 7 except that this device has the arrowhead, connector, and projections rotated 90 degrees about the axis of the arrowhead.
Figure 28:
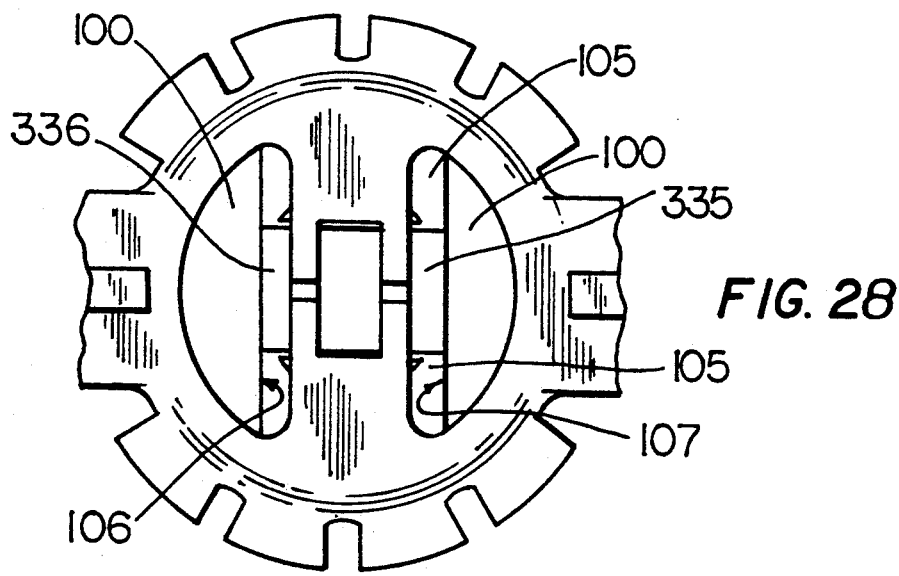
FIG. 28 shows the view and device shown in FIG. 27, but with the arrowhead through and bridging the minor axis of a slot-shaped aperture.

Although the preferred embodiment of the invention is designed for and functions best when the aperture is round, there are occasions when the existing apertures are slots 105 with acceptably small minor diameter, but major diameter which is too large to be stably bridged by the arrow blades. This is not a problem if the preferred embodiment would always be kept with the strap axis (when straight) parallel to the major axis of the aperture, during use. In that case, as shown in FIG. 26, the arrow blade stably bridges the minor axis from the first long edge 106 of the slot-shaped aperture in the wall 100, to the second long edge 107. It might also be acceptable to refine the dimensions of the arrowhead so that the thickness of the arrowhead (perpendicular to the blades) is sufficiently small to be less than the minor axis of the slot, whereas the barb-to-barb distance is great enough to bridge the major axis of the slot. The preferred method of accommodating the slot situation in which the strap axis is held perpendicular to the major axis of the slot during use, is to provide a modified embodiment. This modified embodiment involves molding the product with the material within the support ring 339 rotated 90 degrees, as shown in FIG. 27. Thus, as shown in FIG. 28, the arrow blades 335 and 336 can stably bridge the minor axis from the first long edge 106 of the slot-shaped aperture 105 to the second long edge 107.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A locator tie for use in attaching an element to a wall, the wall having a near surface, a far surface and an aperture communicating between said near surface and said far surface, said locator tie comprising:
   a. a cable tie having a longitudinal axis and including:
      i. a head strap, and
      ii. a tail strap, and
   b. a pushmount fastener coupled to and disposed between said head strap and said tail strap, said pushmount fastener comprising:
      i. a support having a base portion and an upper end portion, the base portion being shaped to define a pair of downwardly extending legs and being attached to the cable tie, the upper end portion having two separate arms, each arm being attached to both legs, and
      ii. a unitary arrowhead, said unitary arrowhead comprising two blades extending upward from said support, each blade having a top, and a hinge connecting the two blades at their tops, each of said blades being attached to a separate one of the two arms of the support, each blade having a longitudinal axis, the longitudinal axes of said two blades defining a plane orthorgonal to the longitudinal axis of said cable tie.

2. A locator tie as recited in claim 1, wherein the pushmount fastener has an axis and each blade has an outwardly facing surface, each of said outwardly facing surfaces having an upper zone and a lower zone, said upper zone being adjacent the hinge and forming a first angle with the axis and lower zone being below said upper zone and forming a second smaller angle with the axis, each arm being attached to its respective blade in said upper zone spaced away from said hinge.

3. A locator tie as recited in claim 2, wherein the base portion of the support is bounded by a meniscus which resists compression when the support is compressed by inward movement of the blades.

4. A locator tie as recited in claim 3, wherein a reenforcement structure is provided at the point where each of the arms of the support connect with the respective blades to resist disconnection of the blade from the arm.

5. A pushmount fastener comprising:
   a. a support having a base portion and an upper end portion, the base portion being shaped to define a pair of downwardly extending legs, the upper end portion extending upward from said base portion and being shaped to define a pair of upwardly extending arms, each arm being attached to both of said pair of downwardly extending legs, and
   b. a unitary arrowhead comprising two blades and a hinge connecting the two blades, each of said blades being attached to a separate one of the two arms of the support, each blade having an upper zone and a lower zone, each arm being attached to its respective blade only in said upper zone and spaced away from said hinge.

6. A locator tie for use in attaching an element to a wall, the wall having a near surface, a far surface and an aperture communicating between said near surface and said far surface, said locator tie comprising:
   a. a cable tie having a longitudinal axis and including:
      i. a head strap, and
      ii. a tail strap, and
   b. a pushmount fastener coupled to and disposed between said head strap and said tail strap, said pushmount fastener comprising:
      i. a support having a base portion and an upper end portion, the base portion being attached to the cable tie, the upper end portion having two separate arms, and
      ii. a unitary arrowhead, said unitary arrowhead comprising two blades extending upward from said support, each blade having a top, and a hinge connecting the two blades at their tops, each of said blades being attached to a separate one of the two arms of the support, each blade having a longitudinal axis, the longitudinal axis of said two blades defining a plane orthogonal to the longitudinal axis of said cable tie,
      iii. each blade having an outwardly facing surface, each of said outwardly facing surfaces having an upper zone and a lower zone, said upper zone being adjacent the hinge and forming a first angle with the axis, said lower zone being below said upper zone and forming a second smaller angle with the axis, said each arm being attached to its respective blade in said upper zone and spaced away from said hinge,
      iv. the base portion of the support being bounded by a meniscus which resists compression when the support is compressed by inward movement of the blades,
      v. a reenforcement structure at the point where each of the arms of the support connect with the respective blades so as to resist disconnection of the blade from the arm,
      vi. the base portion of the support being split to form two legs, one leg being attached to the head strap and the other leg being attached to the tail strap.

7. The locator tie of claim 6, wherein said unitary arrowhead has a vertical axis and wherein each blade has a bottom edge which is angled upward and inward.

8. The locator tie of claim 7 wherein the tail strap of the cable tie has an engagable surface and the head strap includes an engagement head at its outer end, the engagement head being adapted to engage the engagable surface in the tail strap.

9. The locator tie as recited in claim 8, wherein said locator tie further includes a peripheral basket adjacent the pushmount fastener to bias the head strap and tail strap away from the near surface of said wall when the arrowhead of the pushmount fastener is inserted through the aperture.

10. The locator tie of claim 9 wherein the head strap is thicker near the fastener than at the engagement head end.

11. The locator tie of claim 8 wherein the head strap, the tail strap, the pushmount fastener and the peripheral basket are all part of a unitary structure.

* * * * *